United States Patent
Nielsen (10) Patent No.: US 9,638,530 B2
(45) Date of Patent: May 2, 2017

(54) SYSTEM AND METHOD FOR DISTRIBUTION OF 3D SOUND

(71) Applicant: VOLVO CAR CORPORATION, Gothenburg (SE)

(72) Inventor: Jon Werk Nielsen, Copenhagen N (DK)

(73) Assignee: Volvo Car Corporation, Gothenburg (SE)

( * ) Notice: Subject to any disclaimer, the term of this patent is extended or adjusted under 35 U.S.C. 154(b) by 102 days.

(21) Appl. No.: 14/665,312

(22) Filed: Mar. 23, 2015

(65) Prior Publication Data

US 2015/0285641 A1 Oct. 8, 2015

(30) Foreign Application Priority Data

Apr. 2, 2014 (EP) .................................... 14163173

(51) Int. Cl.
*H04R 5/02* (2006.01)
*H04S 7/00* (2006.01)
(Continued)

(52) U.S. Cl.
CPC ....... *G01C 21/265* (2013.01); *G01C 21/3629* (2013.01); *G08G 1/096872* (2013.01); *G10L 13/043* (2013.01); *H04S 7/303* (2013.01); *B60Q 9/00* (2013.01); *H04R 5/02* (2013.01); *H04R 5/04* (2013.01); *H04R 2499/13* (2013.01); *H04S 7/304* (2013.01)

(58) Field of Classification Search
CPC .......... G06F 3/011; G06F 3/012; H04S 7/302; H04S 7/303; H04S 7/304; H04S 2400/01; H04R 1/406; H04R 2201/401; H04R 3/005; H04R 2499/13; H04R 5/02; H04R 5/04; G01C 21/265; G01C 21/3629; G10L 13/043; B60Q 9/00
See application file for complete search history.

(56) References Cited

U.S. PATENT DOCUMENTS 6,243,476 B1 * 6/2001 Gardner ................. H04S 1/007
                                                                381/1
2003/0095669 A1 * 5/2003 Belrose ................ G11B 19/025
                                                                381/56
(Continued)

FOREIGN PATENT DOCUMENTS

EP          2405670 A1     1/2012
EP          2700907 A2     2/2014
WO       2013101061 A1     7/2013

OTHER PUBLICATIONS

Extended European Search Report Dated Sep. 25, 2014, Application No. 14163173.9-1557, Applicant Volvo Car Corporation, 7 Pages.

*Primary Examiner* — Thang Tran
(74) *Attorney, Agent, or Firm* — Snyder, Clark, Lesch & Chung, LLP (57) ABSTRACT

A method and system for distribution of 3D sound in a vehicle comprising two speakers arranged spaced apart in close vicinity of a head of a vehicle operator. The vehicle operator can look in multiple directions, and the system for distribution of 3D sound comprises means to determine at least one of angle and gaze direction of the head of the vehicle operator. Furthermore, the distribution of the 3D sound is based on the determined angle or gaze direction of the head of the vehicle operator.

19 Claims, 6 Drawing Sheets

(51) Int. Cl.
*G01C 21/26* (2006.01)
*G01C 21/36* (2006.01)
*G10L 13/04* (2013.01)
*G08G 1/0968* (2006.01)
H04R 5/04 (2006.01)
B60Q 9/00 (2006.01)

(56) References Cited

U.S. PATENT DOCUMENTS

| 2003/0142842 | A1* | 7/2003 | Arai | A47C 7/72 |
| | | | | 381/300 |
| 2005/0270146 | A1 | 12/2005 | Enya et al. | |
| 2008/0215239 | A1* | 9/2008 | Lee | G01C 21/3629 |
| | | | | 701/441 |
| 2012/0046768 | A1* | 2/2012 | Raoufi | H04M 1/6058 |
| | | | | 700/94 |
| 2014/0218528 | A1* | 8/2014 | Alaniz | H04S 7/302 |
| | | | | 348/148 |

* cited by examiner

SYSTEM AND METHOD FOR DISTRIBUTION OF 3D SOUND

CROSS-REFERENCE TO RELATED APPLICATIONS

This application claims foreign priority benefits under 35 U.S.C. §119(a)-(d) to European patent application number EP 14163173.9, filed Apr. 2, 2014, which is incorporated by reference in its entirety.

TECHNICAL FIELD

The present disclosure relates generally to a system for distribution of 3D sound in vehicles.

BACKGROUND

Operators of vehicles are exposed to large amounts of information from multiple information sources around the vehicle and from within the vehicle itself. The constant flow of information arises from different sources such as road signs, adjacent vehicles, maps, navigation systems, commercial billboards, traffic information, radio stations, and vehicle information. In addition to maintaining a constant speed and monitoring information provided by the vehicle, for example from dials on a dashboard, vehicle operators need to have full control of the surroundings in order to drive safely. This means that large portions of information need to be interpreted in real-time in by the vehicle operator.

In prior art it is known to provide information to vehicle drivers in multiple ways, including visual indications, tactile feedback, and audio playback. Further it is well known how to combine such systems which for example is done in vehicle navigation systems. Information presented to the operator through means of displays or other visual means often comprises distance, direction, or indicative information presenting to the operator a place or direction to associate with the information. Examples are road signs telling the user where the next exit leads or a display within a vehicle navigation system that presents a direction to a specific destination.

Information provided to the operator through speakers or any other form of audio playback is often more general and needs to be associated with events or places in a way that is intuitive for the vehicle operator. This presents multiple problems when an audio representation needs to be associated with actions, directions, distance, or any other subject or item. This has previously been addressed by association where for example a fasten seatbelt sound played in a vehicle is associated to the action of fastening the seat belt. The operator associates this sound with a known course of action, i.e., fastening his or her seatbelt. However, if more complex information shall be presented such associations are not beneficial due to the high level of knowledge and association recognition required in order to interpret the information.

Other solutions comprise spoken information describing the direction, distance, or associated action with the played sound. Examples are navigation systems wherein the user is told to take the third exit to the right, or to leave the interstate in 400 meters. Addition of such information provides guidance for the vehicle operator about where the exit is located but still is dependent on the operator's ability to estimate a distance, such as 400 meters.

There are efforts to address association by embedding information in sound presented in prior art wherein it is known to provide solutions for three-dimensional sound distribution within the passenger compartment of a vehicle. Previous solutions for example describe navigation systems, such as GPS navigation systems, aimed to help a vehicle operator to find the right way to a point of interest through directional sound. Examples of such solutions include creation of directional sound within a passenger compartment where a sound is played with a time difference between speakers mounted diagonally within the passenger compartment. The operator of the vehicle thereby is exposed to a sound that appears to be moving from the far back to the front of the car in the direction of for example a point of interest. The point of interest can for example be a restaurant or gas station and the sound could for example serve the purpose of informing the vehicle operator that there is a gas station nearby.

Directional sound can for example utilize ultrasound to carry the normal sound. Ultrasound has a dB range from 20 kHz up to several gigahertzes, the latter being very high. The dB rates that are suitable to expose a human to without endangering the creation of a hazardous environment are limited, for example excess of 120 dB might lead to hearing losses and above 180 dB might even be fatal. This means that presenting direction sound close to the ears of a vehicle operator in the way described by the prior art is not very suitable and could potentially be dangerous to the user.

Although three-dimensional (3-D) sound has been discussed in prior art, no solution to all the aforementioned problems has been developed. For example, 3D sound as described by the prior art is not adapted to provide a real 3D experience for the vehicle operator and thereby fails to provide important information to the driver in an adequate way.

Most systems presented by prior art furthermore utilize sound sources that are already present in the vehicle in order to provide 3D sound. By using for example a stereo device it is difficult to adapt the sound specifically for the vehicle operator due to the position of the speakers. Such systems often aim at providing 3D sound for everyone in the vehicle and not only the operator. Furthermore, this leads to situations wherein the vehicle operator and passengers might interpret the embedded information in different ways which easily creates confusion.

SUMMARY

An object of the present disclosure is to provide a system for distribution of real 3D sound adapted to present the vehicle operator with adequate information. The disclosure thereby aims to create a complement or replacement to visual displays depending on the application area by replacing the warning and information sounds as used in vehicles of the prior art.

The disclosure relates to a system for distribution of 3D sound in a vehicle comprising two speakers arranged spaced apart in the close vicinity of the head of a vehicle operator, wherein said system for distribution of 3D sound comprises means to determine at least one of an angle and gaze direction of the head of said vehicle operator wherein the system for distribution of 3D sound is adapted to distribute the 3D sound based on the determined angle or gaze direction of the head of said vehicle operator.

The distribution of 3D sound in a vehicle, for example a car, could in some embodiments be confined to a limited space such as a passenger compartment. Although the distribution area is confined the interpretation of the 3D sound and especially the directional and distance information embedded within is generally limited to the speaker positions. It is one advantage of the disclosure to provide a solution wherein the angle and/or gaze direction of the vehicle operator's head is determined in order to further adapt the 3D sound experience and to optimize the 3D effect. Thereby 3D sound can be distributed in a way that the embedded information is interpreted in the correct way independent on which way the vehicle operator looks. The person skilled in the art understands that the vehicle operator might look in any direction while operating the vehicle in order to maintain an overview of what is happening in the surrounding area.

In one embodiment of the system for distribution of 3D sound the system for distribution of 3D sound comprises a vehicle navigation system, said navigation system comprises route calculation means and is adapted to present navigation speech through said system for distribution of 3D sound, wherein said three-dimensional navigation speech is presented as turn-by-turn directions with embedded three-dimensional distance and direction information.

The objective of providing 3D sound that can be correctly interpreted independently of the head position, angle, and gaze direction of the vehicle operator is especially beneficial for navigation systems aiming to provide the vehicle operator with sufficient information in order to find the right way. For example, if information about the next intersection is distributed within the passenger compartment of a car while the vehicle operator is looking in the passenger side mirror the vehicle operator in a vehicle equipped with a traditional 3D sound system will not correctly interpret the distance and direction information embedded in the 3D sound. This means that the vehicle operator misinterprets the provided information and uncertainties arise. Such misinterpretations are distracting elements that might mislead the vehicle operator. The person skilled in the art understands that distance and direction information are sound characteristics indicating a direction from which the sound is presented as well as a close/far relation providing the vehicle operator with a conception of how far it is to for example an intersection. The person skilled in the art further understands that such sound characteristics, and especially embedded information such as distance and direction, are directly related to the position of the ears of the vehicle operator in relation to the speakers.

In one embodiment of the system for distribution of 3D sound the directional 3D navigation speech is pre-recorded in 3D.

Pre-recorded 3D sound can in one embodiment of the present disclosure be used to create a "real" 3D effect. The real 3D effect is different from computer generated effects both due to the simplicity of its generation process, described in FIG. 6 and further explained below, but also from the possibility to accurately present both distance and direction information in the same message.

There are different teachings regarding creation of 3D sound and different methods can be used. Pre-recorded 3D sound provides a simplicity allowing for good distance and direction information. Computer generated 3D sound can present similar results however the differences in frequency has shown to be difficult to replicate. For example, the chirp of the frequency that provides additional depth to the 3D sound has shown to be better in pre-recorded 3D sound. It is thereby beneficial to in some embodiments utilize pre-recorded 3D sound instead of computer generated 3D sound.

In one embodiment of the system for distribution of 3D sound the speakers are located in a headrest for the vehicle operator of said vehicle.

The position of the speakers is important in order to provide 3D sound to the vehicle operator. Tests performed in relation to real 3D sound have shown that the best position is to arrange the speakers in the close vicinity of the ears of the vehicle operator. That means that headphones are beneficial however such an arrangement is not considered as practical in many application areas. Thereby it is beneficial to arrange the speakers in the headrest of the seat wherein the vehicle operator is situated. Thereby the speakers have a fixed position that the head angle and/or gaze direction can be determined in relation to. The close vicinity of the head of the vehicle operator means that the speakers might be arranged in for example one of the following ways; within the vehicle operator's head rest, in a helmet worn by the vehicle operator, around the vehicle operators head rest, or as headphones worn on the head of the vehicle operator.

In one embodiment of the system for distribution of 3D sound in a vehicle the system is adapted to distribute the 3D sound exclusively to the vehicle operator.

In one embodiment of the disclosure it is beneficial that the information is exclusive to the vehicle operator, i.e., that only the vehicle operator can hear the 3D sound. This could for example be achieved through directional speakers adapted to only allow persons located in front of the speakers to perceive the sound.

In one embodiment of the system for distribution of 3D sound in a vehicle the system for distribution of 3D sound comprises a blind spot indication system.

The system in accordance with the present disclosure can be used in many different application areas, one example is blind spot indication systems that are aimed to provide the vehicle operator with information regarding other vehicles currently situated in blind spots surrounding the vehicle. Such systems are traditionally indicating the presence of vehicles in the blind spot areas by an indication light. In one embodiment of the disclosure the system for distribution of 3D sound can replace, or work as a complement to, the indication light and instead provide for example a solution wherein the vehicle operator hears the sound of a car in the blind spot. Another embodiment of the disclosure would include a situation wherein the vehicle operator for example is preparing to change lanes when a lorry is situated within the blind spot. The system for distribution of 3D sound can in that situation emit the distinctive sound of a horn from the right direction providing an intuitive indication that will help the vehicle operator to prevent a collision.

In one embodiment of the system for distribution of 3D sound the means to determine at least one of the angle and gaze direction of the head of said vehicle operator is at least one video recording means.

The person skilled in the art understands that the means to determine at least one of the angle and gaze direction of the head of said vehicle operator can be any form of means to conduct such a determination. However, in one preferred embodiment of the disclosure the means are video means adapted to analyze the head of the vehicle operator. Such solutions might in some vehicles already be in place but utilized for different purposes such as identification of tired or unfocused vehicle operators.

In one embodiment of the system for distribution of 3D sound the speakers are arranged substantially on the head of said vehicle operator, preferably as a set of headphones or integrated into a helmet.

For one embodiment of the disclosure it might be beneficial to substantially place the speakers on the head of said vehicle operator. This means that the speakers might be coupled to the head in the form of for example a set of headphones. Another solution that might be beneficial in some situations is to integrate the speakers in to a helmet, hat, or any other piece of garment or protection gear that is worn on the head of said vehicle operator.

In one embodiment of the system for distribution of 3D sound the means to determine at least one of the angle and gaze direction of the head of said vehicle operator is a gyro, accelerometer, or compass.

The use of a gyro, accelerometer, or compass is in some embodiments beneficial in order to determine for example the angle of the vehicle operator's head. This could be especially beneficial in solutions wherein the vehicle operator has the speakers attached to the head in any manner previously described.

In one embodiment of the system for distribution of 3D sound in a vehicle the 3D sound is downloadable from an external source.

The 3D sound used in the system for distribution of 3D sound is in one embodiment of the disclosure downloaded from an external source, such as a server or server in a data center. However, it is understood that the external source can be any form of external source such as a thumb drive, a memory card, CD, smartphone, or any other form of physical storage medium.

According to another aspect, a method is provided in a system for distribution of 3D sound in a vehicle wherein the system comprises two speakers arranged spaced apart in the close vicinity of the head of a vehicle operator. The system further comprises means to determine at least one of the angle and gaze direction of the head of said vehicle operator, wherein the method comprises the steps of:

select a 3D sound to be distributed;
determine at least one of the angle and gaze direction of the head of said vehicle operator;
adapt the distribution of the selected 3D sound based on the determined angle or gaze direction; and
distribute said 3D sound to said vehicle operator.

In another embodiment of the method in a system for distribution of 3D sound the system for distribution of 3D sound is coupled to a vehicle navigation system, said navigation system comprises route calculation means and is adapted to present navigation speech through said system for distribution of 3D sound, wherein the method further comprises the steps of:

conducting route calculations based on a predetermined destination; and
presenting three-dimensional navigation speech in the form of turn-by-turn directions with embedded three-dimensional distance and direction information.

In yet another embodiment of the method for distribution of 3D sound the method further comprises the steps:

pre-recording 3D navigation speech; and
load the pre-recorded 3D navigation speech to a vehicle navigation system.

In another embodiment of the method for distribution of 3D sound the pre-recorded three-dimensional turn-by-turn directions are exclusive to said vehicle operator.

In a preferred aspect and embodiment of the disclosure turn-by-turn directions in 3D are provided to the vehicle operator in the form of navigation speech. Turn-by-turn directions are directions towards a specific predetermined destination that has been entered in to the vehicle navigation system. Turn-by-turn directions provide multiple benefits over 3D sound as presented by the prior art in terms of allowing the vehicle operator to utilize 3D sound during ongoing navigation instead of merely get 3D information regarding points of interest that are nearby.

In yet another aspect of the system for distribution of 3D sound the 3D sound is downloaded from an external source.

BRIEF DESCRIPTION OF THE DRAWINGS

Embodiments according to the disclosure are described below, by way of example, with reference to the accompanying drawings, in which.

DETAILED DESCRIPTION

In the following, a detailed description of different embodiments of the disclosure is provided with reference to the accompanying drawings. All examples herein should be seen as part of the general description and are therefore possible to combine in any way in general terms. Individual features of the various embodiments and methods may be combined or exchanged unless such combination or exchange is clearly contradictory to the overall function of the system for distribution of 3D sound in a vehicle.

Briefly described, the disclosure relates to a system for distribution of 3D sound in a vehicle. The system is adapted to provide a "real" 3D sound experience for the user independent on the head angle or gaze direction. Furthermore, the system discloses a solution for turn-by-turn navigation aided by real 3D sound. The system for distribution of 3D sound in a vehicle further comprises different embodiments of the disclosure described below.

Figure 1:
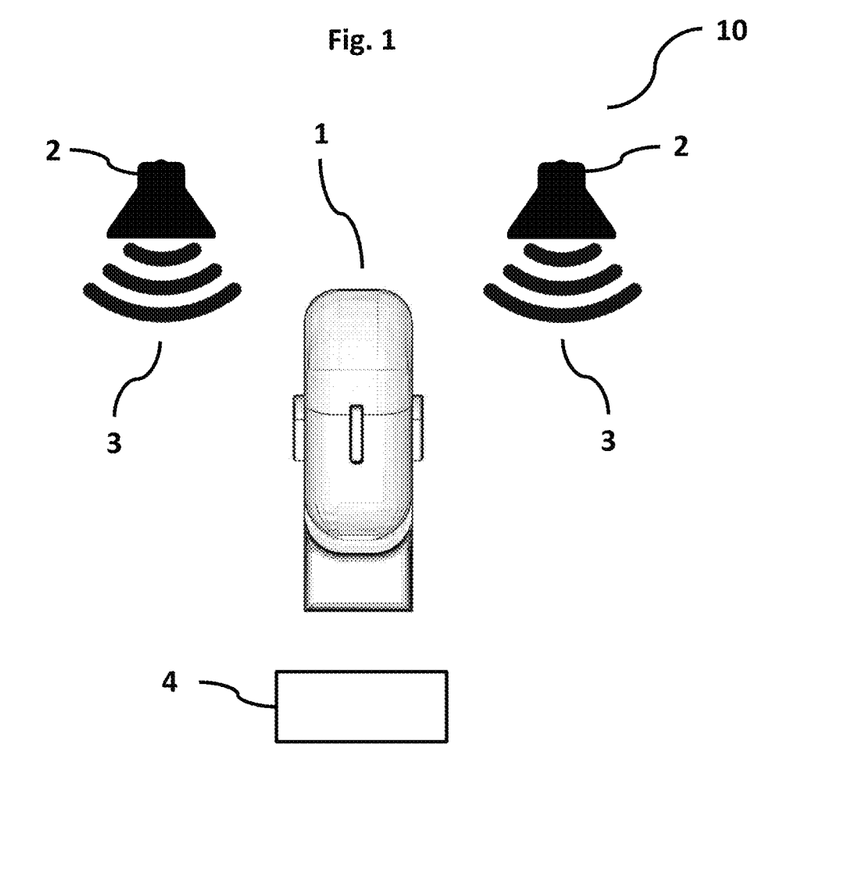
FIG. 1 illustrates a system for distribution of 3D sound in a vehicle.

FIG. 1 illustrates one embodiment of a system 10 for distribution of 3D sound 3 in a vehicle. The system 10 comprises two sound sources 2, such as speakers, arranged spaced apart in the close vicinity of the head 1 of a vehicle operator. The vehicle can be any form of vehicle that is fully or partly operated by a human operator. The person skilled in the art understands that the vehicle operator can look in many different directions while operating the vehicles. Examples are when the operator approaches an intersection and looks in different directions. Movement of the head is also common during normal operation of the vehicle, such as driving in a straight line with a car. The operator has to be alert and look out for obstacles that might be at the side of the road. The system 10 for distribution of 3D sound 3 has multiple purposes that help the vehicle operator to interpret and understand information. The two speakers 2 located in the close vicinity of the vehicle operator's head 1 are distributing the 3D sound 3 comprising information about direction and distance. This means that the 3D sound 3 is adapted to be distributed in a way that the vehicle operator understands from which direction and how far the source that the sound imitates is. For example, a vehicle navigation system provides information about a point of interest by presenting the information to the driver in a way that the driver interprets the 3D sound 3 to be sounding from the direction of the point of interest and with a correct translation of the distance to said point of interest. In order for the system 10 for distribution of 3D sound 3 to be able to reproduce the 3D sound 3 the position of the speakers 2 in relation to the ears of the vehicle operator is crucial. In general the position of a vehicle operator is known to the system but as previously described the vehicle operator tends to move both the upper body and especially the head 1 in order to maintain a clear view of the surrounding area. In order to correctly distribute the 3D sound 3 the system 10 thereby needs to compensate for such movement. FIG. 1 further illustrates means 4 to determine at least one of the angle and gaze direction of the head 1. The angle of the head 1 is the offset angle from when the operator is looking straight forward. For example, in one embodiment the head angle when the operator is looking straight ahead is 0°. Depending on the determined angle the system 10 for distribution of 3D sound 3 will adapt the signal and present a real 3D experience providing the vehicle operator with the right information.

The system 10 may further comprise means for speed adjustment that are adapted to adjust the 3D sound 3 in relation to the traveling speed of the vehicle.

Figure 2:
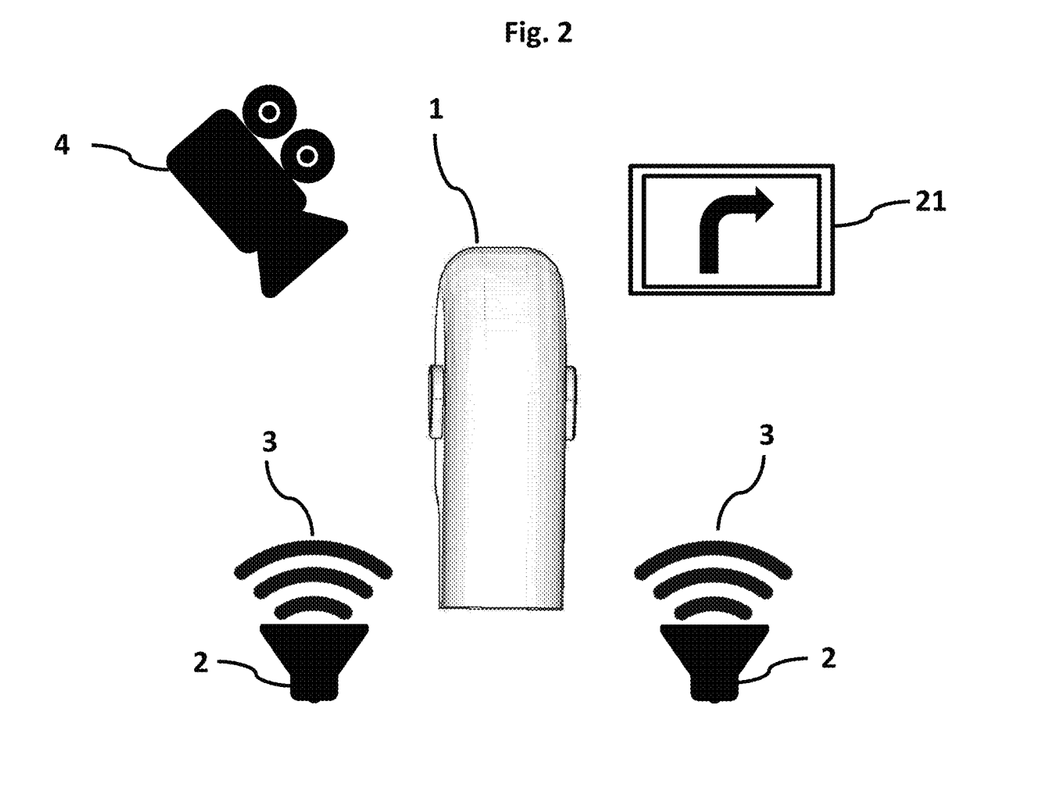
FIG. 2 illustrates a system for distribution of 3D sound in a vehicle, wherein the system is coupled to a vehicle navigation system.

FIG. 2 illustrates a preferred embodiment of the present disclosure wherein the system 10 for distribution of 3D sound 3 is coupled to a vehicle navigation system 21 such as a GPS navigation system. The vehicle navigation system 21 might be any form of navigation system 21 and may for example comprise a display illustrating navigation information to the vehicle operator. Navigation systems 21 provide navigation information to the vehicle operator through navigation speech. Navigation speech can be any form of navigation speech adapted to inform the vehicle operator about any information relevant to his or her journey. Such information can for example be that the vehicle operator shall turn right at the next intersection or leave the roundabout at the third exit. Such information is easy to misunderstand, especially if they are other exits or roads on the way that are for example very small. By the addition of 3D sound the vehicle operator gets clear directional information and can with ease interpret the information in the intended way.

The following embodiment describes a beneficial embodiment as implemented in the system as illustrated by FIG. 2. The vehicle operator is navigating by means of the vehicle navigation system 21 towards a destination of travel. The system 10 for distribution of 3D sound 3 is coupled to the vehicle navigation system 21 and is arranged to provide 3D navigation speech to the vehicle operator. The vehicle navigation system 21 has determined that the vehicle operator should turn right in 300 meters in order to continue traveling towards the destination. In order to inform the vehicle operator about this information the information can for example be shown on a display coupled to said navigation system 21. In addition the vehicle navigation system 21 interacts with the system 10 for distribution of 3D sound 3 in order to provide 3D navigation speech. The head angle and/or gaze direction of said vehicle operator's head is determined by the means 4 for determination the angle and/or gaze direction of the head of said vehicle operator. The means 4 can be any form of means 4 adapted to determine the angle and/or gaze direction of the vehicle operator's head such as for example video means 4. The video means 4 can for example be one or more video cameras adapted to detect the angle or gaze direction of the vehicle operator's head. The determination of the angle or gaze direction can for example be conducted through image recognition. The person skilled in the art understands that the means 4 for determination of the angle and/or gaze direction of the vehicle operator's head can be any form of determination means such as distance sensors, gyros, accelerometers, etc.

Figure 3:
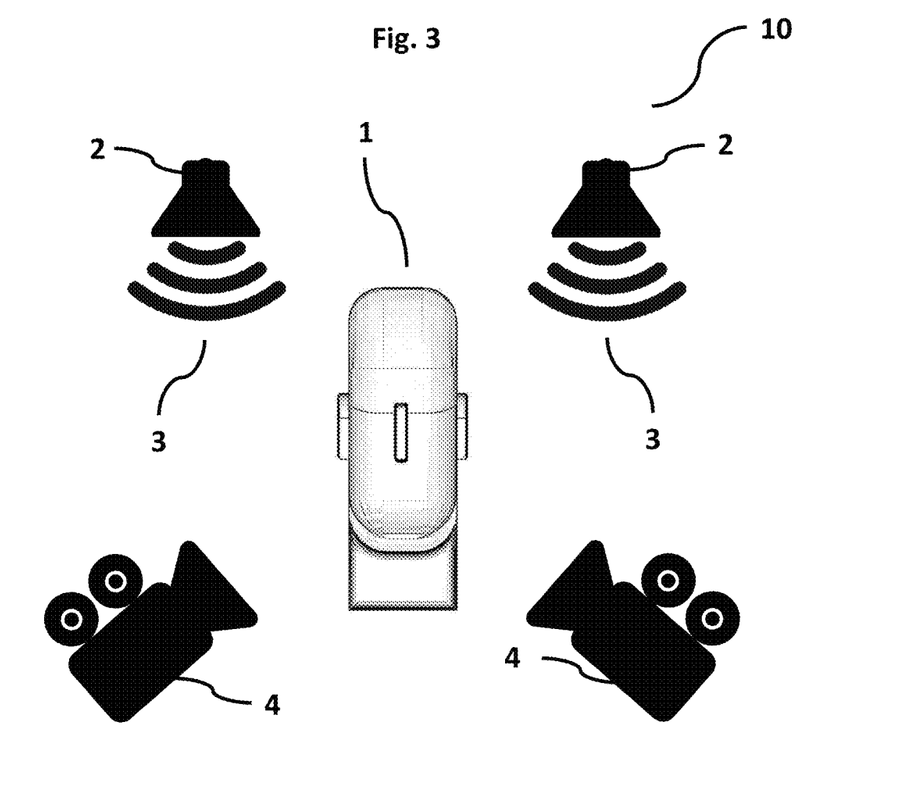
FIG. 3 illustrates a second embodiment of said system for distribution of 3D sound in a vehicle.

It is further understood that the system 10 as shown in FIGS. 1-3 might be coupled to other devices than a vehicle navigation system. For example, in one embodiment of the disclosure the system 10 for distribution of 3D sound 3 is coupled to a blind spot indication system.

FIG. 3 illustrates one embodiment of the disclosure wherein the vehicle operator is looking straight ahead. This could for example be determined by calibration of this state as a head angle of 0°. The person skilled in the art understands that any form of numeric or other form of scale could be used in order to define the head angle. When the vehicle operator is looking straight ahead the 3D sound is broadcast in its default setting without any compensation for the head angle, meaning that the sound is interpreted as if the vehicle operator is looking in the vehicle's direction of travel.

The system 10 as illustrated in FIG. 3 can further comprise different embodiments wherein for example the sound sources 2 can be arranged within the headrest of a seat wherein the vehicle operator is located during operation of the vehicle. The positions as illustrated in any of the figures are examples and not limiting to the scope of the disclosure. It is thereby understood that the sound sources 2 can be arranged in any suitable way in accordance with the present disclosure.

In one embodiment as described by FIG. 1 or 3 the 3D sound 3 might be exclusive to the vehicle operator through for example means of directional speakers, adapted volume, or headphones.

Figure 4:
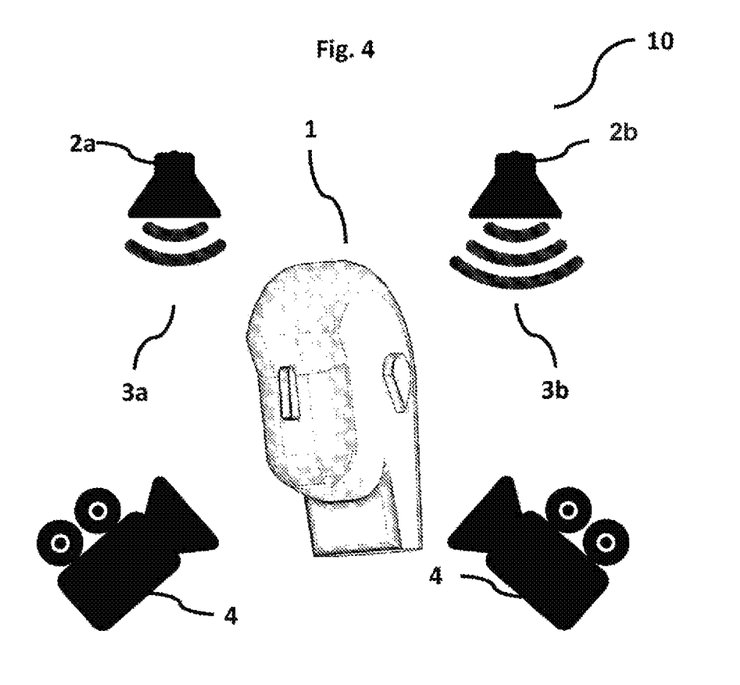
FIG. 4 illustrates a second state of said second embodiment of the system for distribution of 3D sound in a vehicle.
Figure 5:
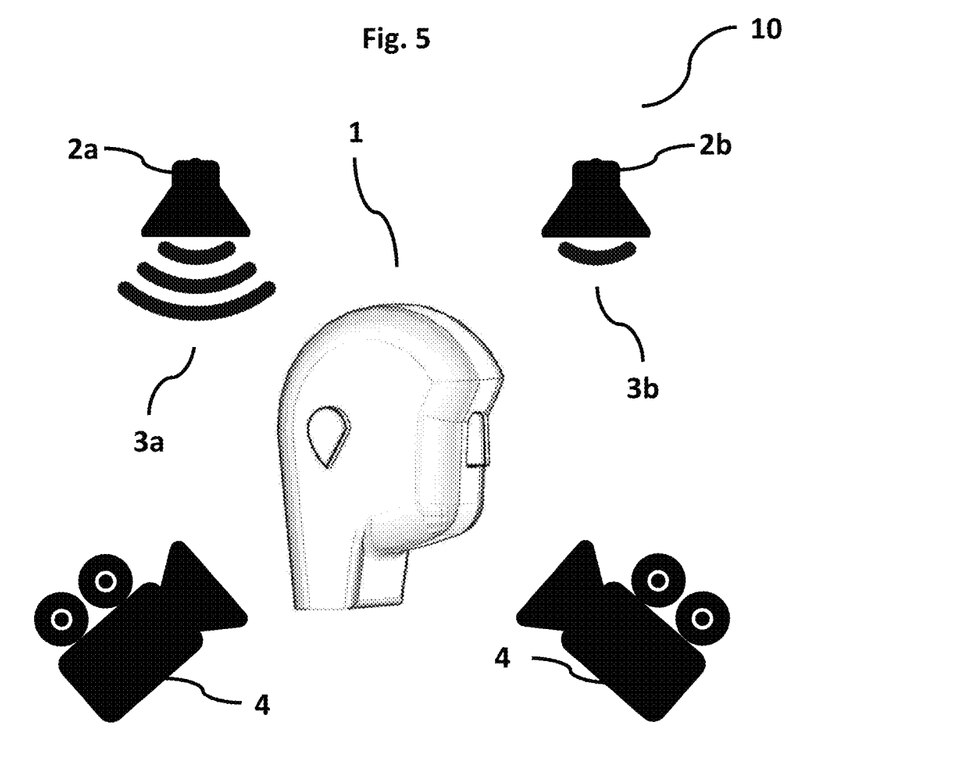
FIG. 5 illustrates a third state of said second embodiment of the system for distribution of 3D sound in a vehicle.

FIG. 4 illustrates one embodiment of the disclosure wherein the vehicle operator is looking in a direction that is different from the direction illustrated in FIG. 3. The head 1 of the vehicle operator is thereby directed at angle in relation to the direction of travel for said vehicle. This means that 3D sound 3a, 3b needs to be distributed differently in order for the vehicle operator to interpret the information correctly. This is illustrated in FIGS. 4 and 5 by the different sound characteristics for the first speaker 2a and the second speaker 2b. The first sound 3a and the second sound 3b are thereby adapted based on the angle of the head 1 of the vehicle operator.

FIG. 5 illustrates one embodiment where the vehicle operator is looking in a direction different from FIGS. 3 and 4 while the sound characteristics of the first sound 3a and second sound 3b are different.

Figure 6:
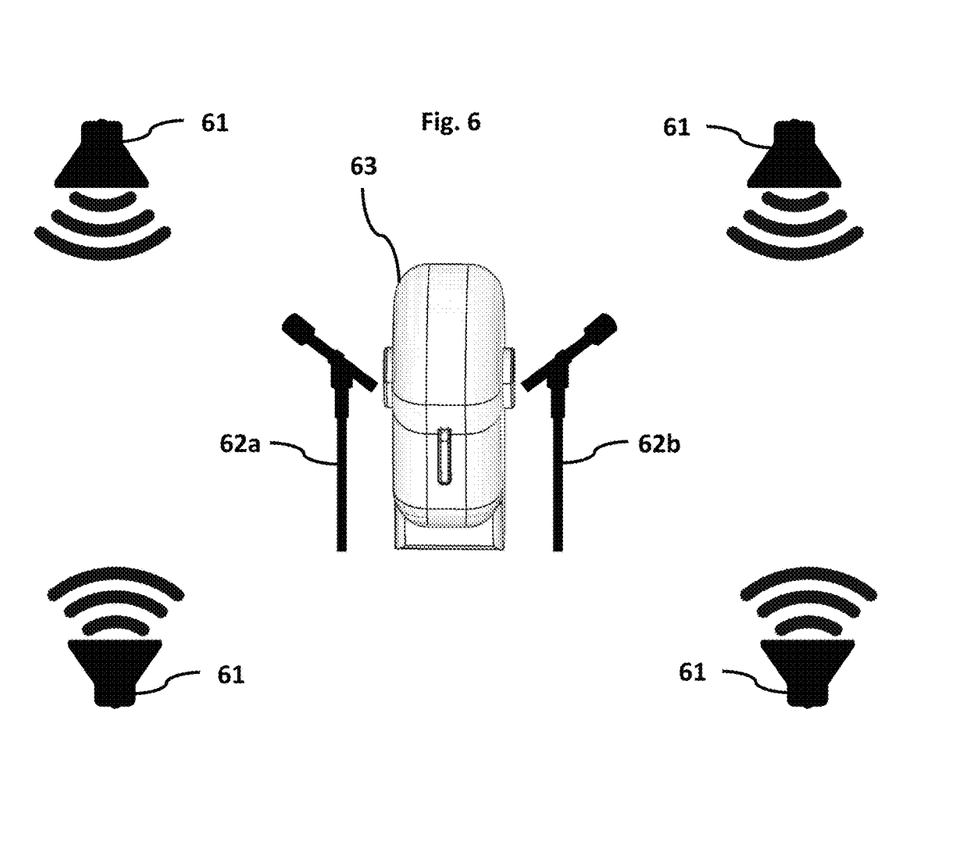
FIG. 6 illustrates a setup for recording of pre-recorded 3D sound for a system for distribution of 3D sound in a vehicle.

There are multiple ways to create 3D sound that can be used in a system 10 for distribution of 3D sound in accordance with the present disclosure. For example, 3D sound can in one embodiment be pre-recorded where a physical 3D environment is used to create 3D effects. In another embodiment the 3D sound is computer generated through for example synthesis. The person skilled in the art understands that any combination of pre-recorded and computer generated 3D sound can be used in some embodiments of the disclosure. FIG. 6 illustrates a typical setting for pre-recording wherein a real 3D effect is created through recording of 3D sound in a physical environment. In a substantial center of an open space two microphones 62a, 62b are placed. Those can for example be placed within the ears of a dummy head 63 or positioned in any other way to substantially correspond to the position of human ears. One or more speakers 61 can after that be moved around in the open space allowing for recording of 3D sound from different angles and distances.

FIG. 6 illustrates a pre-recording setting for recording 3D sound 3 that may be used in a system 10 for distribution of 3D sound 3 in a vehicle. Two microphones 62a, 62b, or any other form of recording means, are arranged for example in the ears of a dummy head 63 in order to correctly create a model of a human vehicle operator. Sounds are thereafter recorded through moving the sound sources 61 to different parts of an open space wherein said dummy head 63 is located. This is illustrated by the different sound sources 61 in FIG. 6. The person skilled in the art understands that the sound source 61 either can be one source that is moved around in the open space or multiple fixed or movable sourced utilized to output sound at the right position.

The person skilled in the art understands that the means for recording sound 62a, 62b can be arranged to resemble the position of the ears of a human without the utilization of a dummy head 63.

In another embodiment of the disclosure the pre-recorded 3D sound is a combination of pre-recording technology and computer modulation of the 3D sound. An example is sound recorded in accordance with FIG. 6 wherein one of the means to record sound 62b is eliminated. The sound recorded through the remaining means to record sound 62a is later modulated with a computer to create a 3D sound.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A system for distribution of 3D sound in a vehicle comprising:
   two speakers configured to be spaced apart in close vicinity of a head of a vehicle operator;
   at least one video camera configured to determine at least one of an angle or gaze direction of the head of the vehicle operator; and
   a vehicle navigation system configured to provide route directions and to provide navigation speech associated with the route directions through the two speakers as turn-by-turn directions,
   wherein the system for distribution of 3D sound is configured to output the 3D sound via the two speakers based on the determined angle or gaze direction of the head of the vehicle operator.

2. The system for distribution of 3D sound according to claim 1 wherein the vehicle navigation system is configured to provide the turn-by-turn directions with embedded three-dimensional distance and direction information.

3. The system for distribution of 3D sound according to claim 1, wherein the navigation speech is pre-recorded using sound sources that are moved to different locations in a second vehicle.

4. The system for distribution of 3D sound according to claim 1 wherein the two speakers are configured to be located in a headrest for the vehicle operator.

5. The system for distribution of 3D sound according to claim 1 wherein the system is configured to distribute the 3D sound exclusively to the vehicle operator.

6. The system for distribution of 3D sound according to claim 1 further comprising a blind spot indication system.

7. The system for distribution of 3D sound according to claim 1 wherein the at least one video camera configured to determine at least one of the angle or gaze direction of the head of the vehicle operator comprises two cameras.

8. The system for distribution of 3D sound according to claim 1 wherein the two speakers are configured to be positioned substantially adjacent the head of the vehicle operator.

9. The system for distribution of 3D sound according to claim 8 wherein the speakers are provided as a set of headphones or are integrated into a helmet.

10. The system for distribution of 3D sound according to claim 1, further comprising:
    a gyro configured to determine at least one of the angle or gaze direction.

11. The system for distribution of 3D sound according to claim 1, further comprising:
    an accelerometer configured to determine at least one of the angle or gaze direction.

12. The system for distribution of 3D sound according to claim 1, further comprising:
    a compass configured to determine at least one of the angle or gaze direction.

13. The system for distribution of 3D sound according to claim 1 wherein the 3D sound is provided via an external source.

14. A method for distribution of 3D sound in a vehicle using a system for distribution of 3D sound that comprises two speakers configured to be arranged spaced apart in close vicinity to a head of a vehicle operator and an angle determining device configured to determine at least one of an angle or gaze direction of the head of the vehicle operator, the method comprising:
    selecting, from a vehicle navigation system, a 3D sound to be distributed;
    determining at least one of the angle or gaze direction of the head of the vehicle operator via the angle determining device;
    modifying the selected 3D sound based on the determined angle or gaze direction; and
    distributing the 3D sound to the vehicle operator via the two speakers.

15. The method according to claim 14 wherein the system for distribution of 3D sound is coupled to the vehicle navigation system, wherein the vehicle navigation system generates route directions and is configured to present navigation speech through the system for distribution of 3D sound, and wherein the method further comprises:
    conducting route calculations based on a predetermined destination; and
    presenting three-dimensional navigation speech in the form of turn-by-turn directions with embedded three-dimensional distance and direction information.

16. The method according to claim 15 further comprising:
    pre-recording 3D navigation speech using sound sources that are moved to different locations in a second vehicle; and
    loading the pre-recorded 3D navigation speech to the vehicle navigation system.

17. The method according to claim 15 wherein the distributing the 3D sound comprises outputting turn-by-turn directions exclusive to the vehicle operator.

18. The method according to claim 14, further comprising:
    downloading the 3D sound from an external source.

19. The method of claim 14, wherein the distributing the 3D sound comprises:
   determining a traveling speed of the vehicle; and
   adjusting the 3D sound based on the traveling speed.

* * * * *